No. 12,229. REISSUED JUNE 7, 1904.
W. H. SAUVAGE.
AIR BRAKE.
APPLICATION FILED APR. 20, 1904.
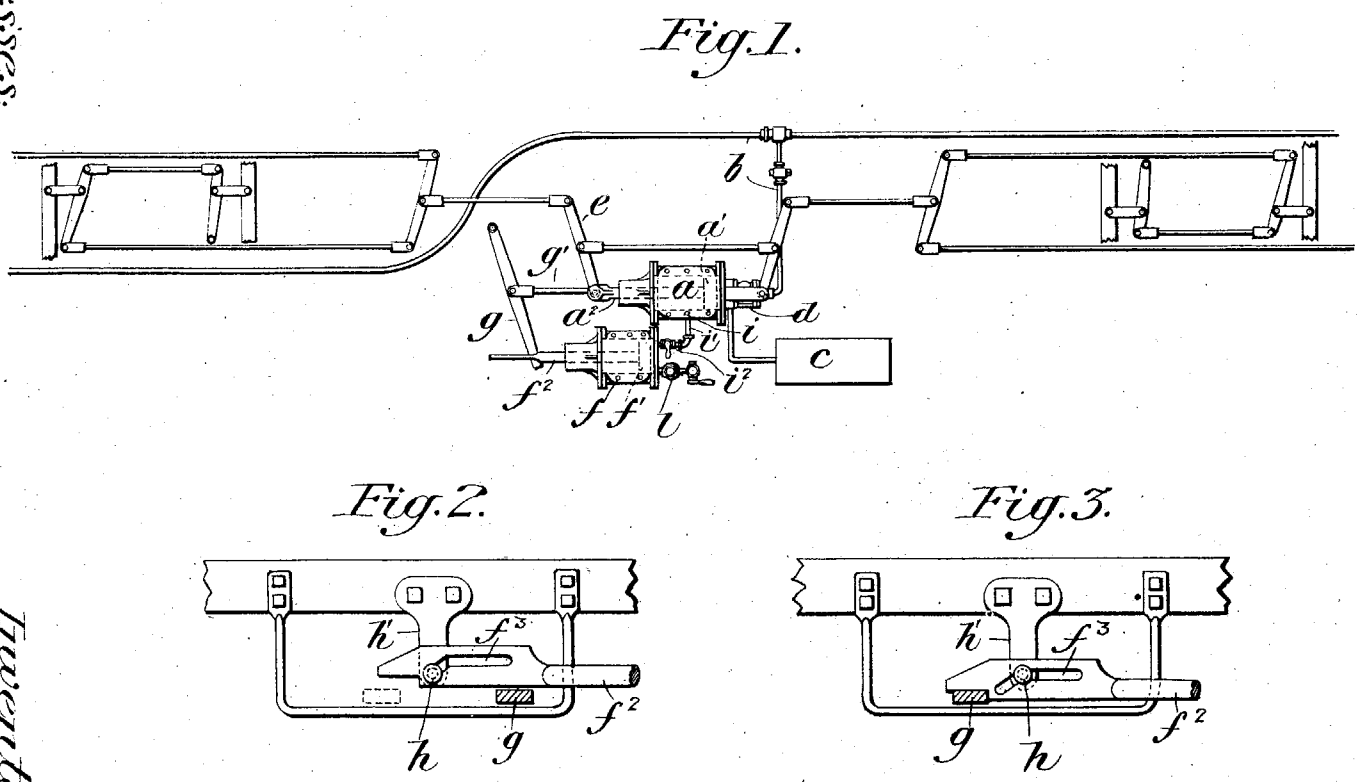
Witnesses:
A. N. Jesbra
M. A. Brayley
Inventor:
William H. Sauvage
by Redding Kiddle & Greeley
Atty's No. 12,229 Reissued June 7, 1904.

UNITED STATES PATENT OFFICE.

WILLIAM H. SAUVAGE, OF NEW YORK, N. Y., ASSIGNOR OF PART TO GEORGE F. KISSAM, OF NEW YORK, N. Y.

AIR-BRAKE.

SPECIFICATION forming part of Reissued Letters Patent No. 12,229, dated June 7, 1904.

Original No. 752,111, dated February 16, 1904. Application for reissue filed April 20, 1904. Serial No. 204,040½.

*To all whom it may concern:*

Be it known that I, WILLIAM H. SAUVAGE, a citizen of the United States, residing in the borough of Manhattan, of the city of New York, in the State of New York, have invented certain new and useful Improvements in Air-Brakes, of which the following is a specification, reference being had to the accompanying drawings, forming a part hereof.

One object of this invention is to provide a quick and powerful automatic brake apparatus by which it shall be possible not only to secure a much higher degree of emergency braking power than has been used heretofore, but to attain this result with a much lower degree of air or other fluid pressure than has been found necessary heretofore in emergency applications of the brakes on high-speed trains.

It is also the object of the invention to provide for the application of normal brake-pressure at slow speeds with a much lower degree of air-pressure than is commonly required and for the gradual and automatic reduction of the emergency brake-pressure to the normal or service brake-pressure as the speed of the train is reduced, so that there shall be no undue gripping of the wheels, with consequent sliding.

The apparatus in which the invention is embodied is adapted for use under all conditions of operation and is capable of application to existing brake apparatus without modification thereof other than the addition of a few single parts. No more than the standard air-pressure of seventy pounds in the train-pipe is required for the improved apparatus, and provision is therefore made for the immediate reduction of the present high-speed train-line pressure of one hundred and ten pounds to the standard pressure of seventy pounds should the car equipped with the improved apparatus be cut into a train which is otherwise equipped for a high-speed pressure of one hundred and ten pounds. For the ordinary service applications of the brakes only about one-third of the air-pressure heretofore used in the brake-cylinder is required in the improved apparatus to give the necessary and normal full service-power, so that most of the air in the auxiliary reservoir is saved for further use, although when emergency applications are made then the full standard pressure in the brake-cylinder, as well as in the additional pressure derived from the train-pipe, as in some systems, is called into play. It is therefore possible to secure a considerable number of full service applications for only one charge of the auxiliary reservoir, thereby saving much wear and tear on the pump and reserving plenty of air in the auxiliary reservoir for future full service stops at normal brake-pressure without recharging, while the full train-pipe pressure is available for emergency applications, yielding under entirely practicable conditions as much as three times the brake-pressure heretofore used in emergency applications. Furthermore, the emergency application is so made that the shock which has heretofore resulted from an emergency application of the brakes is very much modified.

It will be understood, of course, that the improved apparatus also provides for the retaining of the normal service braking pressure when the speed of the train has been reduced after an emergency application of the brakes.

In the improved apparatus in addition to the usual auxiliary reservoir and brake-cylinder, which are of such relative capacity that when the full auxiliary-reservoir pressure is admitted it will give about fifty pounds of air-pressure in the brake-cylinder with an eight-inch piston travel, there is provided an auxiliary brake-cylinder, which is so connected to the brake-lever system as to act with a leverage considerably greater than that with which the main brake-cylinder acts and is brought into operation after the movement of the main brake-cylinder piston has begun, being preferably connected to a port in the wall of the main brake-cylinder, which is uncovered by the forward movement of the main brake-cylinder piston. To the additional cylinder is connected a retaining-valve, which permits the pressure therein to be slowly reduced to the normal pressure of about seventeen pounds after an emergency application of the brakes has been made, so that the brake-pressure shall be gradually reduced as the speed of the train is reduced until the brake-pressure reaches the degree required for a normal service stop, at which point the pressure in the two cylinders is maintained until the brakes are released. There is also connected with the second cylinder a safety-valve by which the very high pressure heretofore used for emergency application of the brakes on high-speed trains can be reduced quickly to the normal emergency pressure of about sixty pounds.

The invention will be more fully described hereinafter with reference to the accompanying drawings, in which for purposes of illustration and explanation of the nature of the invention there is represented a convenient and practical embodiment of the invention, and in which—

Figure 1 is a general diagrammatic or plan view of a brake apparatus which embodies the invention. Figs. 2 and 3 are detail views illustrating the relation of the second piston-rod to the special cylinder-lever.

The brake-lever system and most of the other parts of a complete apparatus to which the present invention is applied may be of any usual or preferred construction and arrangement and being well understood in the art need not be illustrated nor described in detail, and they will be referred to herein only so far as may be necessary to explain their relation to those parts of the apparatus with which the invention is particularly concerned.

The main brake-cylinder $a$ is connected to the train-pipe $b$ and the auxiliary reservoir $c$ through the medium of a triple valve, (indicated at $d$,) the construction and operation of the triple valve being well understood. The main-cylinder piston $a'$ is connected, as usual, by its rod $a^2$ to the main-cylinder lever $e$, which is in turn connected to the system of brake-levers, as usual. The second or auxiliary cylinder $f$ is preferably a short cylinder, since its piston has only a short stroke, and is preferably of the same diameter as the main cylinder $a$, although it might be of a different diameter, and particularly of a smaller diameter, if it is not desired that the aggregate braking pressure effected by the two cylinders shall be several times greater than the maximum-braking pressure which can be effected by the main cylinder alone operating in the manner heretofore well known. Its piston $f'$ is arranged to act through the rod $f^2$ upon an auxiliary-cylinder lever $g$, which is connected, as by a link or rod $g'$, with the brake-lever system, preferably at the point where the main-cylinder piston-rod $a^2$ is connected to the main-cylinder lever $e$. The lever $g$ is so arranged as to permit the piston-rod $f^2$ to act through a greater leverage than that through which the piston-rod $a^2$ acts, the rod $g'$ being conveniently connected to the lever $g$ at the middle point of the latter between its fulcrum and the point of application of the power, so that the piston-rod $f^2$ shall act with twice the leverage of the piston-rod $a^2$. The piston-rod $f^2$ and the lever $g$ are furthermore so arranged that the lever may return freely to its initial position when released and that the piston-rod shall engage the lever as it begins its forward movement. To this end the piston-rod $f^2$, which has the necessary freedom of movement, is provided near its end with a slot $f^3$, the outer portion of which is inclined downward. The slot is engaged by a supporting-pin $h$, carried by a suitable bracket $h'$, depending from the framework of the car, so that the end of the piston-rod is at all times supported and is moved out of the path of the lever $g$ as the piston-rod completes its rearward stroke, moving into engagement with said lever as it begins its forward stroke. It will be obvious that various other devices might be provided to effect or permit the necessary engagement of the piston-rod with the lever during the forward movement of the piston-rod and its non-interference with the free rearward movement of the lever when released.

The second or auxiliary cylinder $f$ is arranged to come into operation after the main cylinder $a$ has commenced its action, and preferably as the brakes are set or nearly set for a service stop, so that the action of the main cylinder shall be reinforced by the action of the auxiliary cylinder at a point when the main cylinder has properly done its work, the effect of the auxiliary cylinder, acting at such a time through its greater leverage, being to set the brakes much harder. With an air-pressure of about seventeen pounds in the two cylinders the aggregate effect of the two cylinders is about equal to that which would be produced by the main cylinder acting alone with an air-pressure of about fifty pounds, such as is ordinarily used in a single cylinder for a service application of the brakes, while if the full ordinary pressure of about fifty pounds is admitted to both cylinders, as is done in the improved apparatus for an emergency application, the aggregate effect of the two cylinders is much greater than that of a single cylinder operating in the usual manner for an emergency application. In the arrangement represented in the drawings, in which the power of the auxiliary cylinder is the same as that of the main cylinder and the leverage of the auxiliary cylinder is twice that of the main cylinder, the aggregate effect of the two cylinders, as will be readily understood, is substantially three times that of the single cylinder.

It will be obvious that the auxiliary cylinder can be brought into operation by different means, the movement of the main-cylinder piston or of some part connected thereto being preferably utilized to determine the time at which the action of the auxiliary cylinder shall begin. In the device represented in the drawings, which is well adapted for the purpose, the main cylinder *a* is provided in its side wall with a port *i*, which is uncovered by the piston *a'* in its forward movement, so that the air or other fluid medium employed shall be admitted to the auxiliary cylinder behind its piston *f'*, a suitable pipe *i'* being provided to conduct the air from the port *i* to the head of the cylinder *f* and being equipped with a cut-out cock $i^2$, if desired. If the full stroke of the main piston with the brakes properly adjusted is about six inches, it is preferable to place the port *i* a little less than six inches from the head of the cylinder *a*, so that the auxiliary-cylinder piston shall have a forward movement of about two inches to reinforce the action of the main-cylinder piston, the total movement of the two pistons being eight inches. As already explained, the end of the auxiliary piston-rod $f^2$ moves into engagement with the auxiliary-cylinder lever *g* as the piston-rod begins its movement and continues its forward movement in engagement therewith.

A retaining-valve *k* of ordinary construction is fixed on an elbow piped into the head of the auxiliary cylinder, this retaining-valve being set to retain a pressure of about seventeen pounds in the auxiliary cylinder and of course in the main cylinder as well and being arranged, as usual, to permit any excess of pressure above seventeen pounds to be slowly reduced, so that after an emergency application of the brakes when the full air-pressure of the auxiliary reservoir is admitted to the cylinder *a* and thereafter to the cylinder *f* this emergency pressure in the two cylinders shall be reduced as the speed of the train is reduced to prevent locking and sliding of the wheels. A safety-valve *l*, also of ordinary construction, is applied to the head of the auxiliary cylinder and is preferably set to open at about sixty pounds, so that when a car equipped with the improved apparatus is cut into a train equipped with a high-speed quick-action brake apparatus of the ordinary type intended to supply a pressure of about one hundred and ten pounds for an emergency application the excess of pressure above sixty pounds in an emergency application shall be quickly cut down lest the wheels should be locked even at high speed by reason of the great brake-power exerted by the improved apparatus. The retaining-valve *k* of course acts to reduce the excessive pressure; but its action is too slow until the pressure has been reduced to the normal pressure of about sixty pounds. Thereafter the retaining-valve acts alone to reduce the pressure gradually as the speed of the train is reduced.

The application of the improved apparatus makes no difference in the operation of the well-known brake systems, except as to the pressures employed. So far as its own operation is concerned it will be understood that when the engineer makes a reduction in the train-line pressure, so that the triple valve is operated to permit the pressure from the auxiliary reservoir to enter the main brake-cylinder, and the main-cylinder piston has moved far enough to set the brakes against the wheels and at the same time to uncover the port *i* in the side wall of the main cylinder, then the auxiliary-cylinder piston-rod moves forward and downward against the auxiliary-cylinder lever *g* and continues to move forward for a short distance, increasing through its described connection with the lever system the pressure of the brake-shoes against the wheels and in the arrangement illustrated multiplying the pressure, so that the aggregate effect of the two cylinders is three times that which would be produced by the main cylinder alone. It is therefore necessary to admit from the auxiliary reservoir to the main cylinder much less air than has heretofore been required for a service stop, thereby reserving in the auxiliary chamber the most of the air therein and keeping it available for subsequent service stops or even for an emergency stop without recharging. Should it be required to make an emergency stop, the full pressure of the auxiliary reservoir is admitted to the main cylinder and in succession to the auxiliary cylinder, thereby producing at the outset a much greater braking pressure than it has been practicable to obtain heretofore. At the same time the great pressure is steadily relieved by the escape of air through the retaining-valve as the speed of the train is reduced until the normal service-pressure is reached in both cylinders. The final release of the brakes is effected in the usual manner by an increase of pressure in the train-pipe. As the auxiliary-cylinder piston approaches the limit of its rearward movement the disengagement of its rod from the auxiliary brake-lever *g* is effected and the lever is free to continue its rearward movement with the main-cylinder piston. It will be obvious that any desired graduations of brake-pressure for service stops can be secured with the improved apparatus in the same manner as with the ordinary apparatus heretofore employed. It is to be noted especially that in an emergency application of the brakes the main-cylinder piston is driven forward with the usual high velocity, but that as the pressure between the two cylinders is utilized somewhat slowly the final movement of the main-cylinder piston and the whole movement of the auxiliary-cylinder piston take place somewhat slowly, so that the full emergency pressure of the brakes is attained somewhat gradually, thus avoiding the severe shock which is ordinarily occasioned by an emergency application of the brakes with a single brake-cylinder.

Reference has been made herein to air as the fluid medium employed; but it will be understood that any other suitable fluid medium may be employed in place of air and that various changes in the construction and arrangement of the apparatus may be made as convenience or preference may suggest without departing from the spirit of the invention.

I claim as my invention—

1. In a fluid-pressure brake system, the combination with a brake-lever system, of a main brake-cylinder, an auxiliary brake-cylinder and means controlled by the movement of the main-cylinder piston to admit air under pressure to the auxiliary cylinder to reinforce the main cylinder after the action of the main cylinder has begun, substantially as described.

2. In a fluid-pressure brake system, the combination with a brake-lever system, of a main brake-cylinder having a port in its side wall arranged to be uncovered by the piston in its forward movement and an auxiliary brake-cylinder connected to said port, substantially as described.

3. In a fluid-pressure brake system, the combination with a brake-lever system, of a main brake-cylinder, directly connected to the brake-lever system, an auxiliary brake-cylinder, lever connections, affording increased leverage, between the auxiliary-cylinder piston and the main brake-lever system, and means controlled by the movement of the main-cylinder piston to admit air under pressure to the auxiliary cylinder to reinforce the main cylinder after its action has begun, substantially as described.

4. In a fluid-pressure brake system, the combination with a brake-lever system, of a main brake-cylinder directly connected to the brake-lever system, an auxiliary brake-cylinder, an auxiliary-cylinder lever connected to the main brake-lever system and means whereby the auxiliary-cylinder piston-rod is moved transversely into the path of said lever during the forward movement of the piston-rod, substantially as described.

5. In a fluid-pressure brake system, the combination with a brake-lever system, of a main brake-cylinder directly connected with the brake-lever system, an auxiliary cylinder, an auxiliary-cylinder piston-rod having in its free end a cam-slot, a fixed pin to engage said cam-slot and an auxiliary-cylinder lever connected to the main brake-lever system, whereby the said piston-rod is moved into the path of said lever in its forward movement and out of the path of said lever in its rearward movement, substantially as described.

6. In a fluid-pressure brake system, the combination with a brake-lever system, of a main brake-cylinder, an auxiliary brake-cylinder, means whereby the auxiliary cylinder is brought into action to reinforce the main cylinder through the forward movement of the main-cylinder piston, and means to automatically and gradually reduce the pressure in said cylinders, substantially as described.

7. In a fluid-pressure brake system, the combination with a brake-lever system, of a main brake-cylinder, an auxiliary brake-cylinder, means whereby the auxiliary cylinder is brought into action to reinforce the main cylinder through the forward movement of the main-cylinder piston, and a retaining-valve connected to one of said cylinders, substantially as described.

8. In a fluid-pressure brake system, the combination with a brake-lever system, of a main brake-cylinder, an auxiliary brake-cylinder, means controlled by the forward movement of the main-cylinder piston to admit air under pressure to the auxiliary piston, and means to automatically and gradually reduce the pressure in said cylinders, substantially as described.

9. In a fluid-pressure brake system, the combination with a brake-lever system, of a main brake-cylinder, an auxiliary brake-cylinder, means controlled by the forward movement of the main-cylinder piston to admit air under pressure to the auxiliary cylinder and a retaining-valve connected to one of said cylinders, substantially as described.

10. In a fluid-pressure brake system, the combination with a brake-lever system, of a main brake-cylinder having a port in its side wall, an auxiliary brake-cylinder connected to said port, and means to automatically reduce the pressure in said cylinders, substantially as described.

11. In a fluid-pressure brake system, the combination with a brake-lever system, of a main brake-cylinder having a port in its side wall, an auxiliary brake-cylinder connected to said port and a retaining-valve connected to one of said cylinders, substantially as described.

12. In a fluid-pressure brake system, the combination with a brake-lever system, of a main brake-cylinder, an auxiliary brake-cylinder, means controlled by the movement of the main-cylinder piston to admit air under pressure to the auxiliary cylinder, a safety-valve connected to one of said cylinders, and means for gradually reducing the pressure in the cylinders after the safety-valve has closed to a predetermined amount, substantially as described.

This specification signed and witnessed this 20th day of April, A. D. 1903.

WILLIAM H. SAUVAGE.

In presence of—

ANTHONY N. JESBERA,
W. B. GREELEY.